Patented Aug. 7, 1951

2,563,142

UNITED STATES PATENT OFFICE 2,563,142

VULCANIZED POLYMER AND METHOD OF MAKING THE SAME

William T. Walton, Chicago, Ill., assignor to The Sherwin-Williams Company, Cleveland, Ohio, a corporation of Ohio No Drawing. Application June 16, 1947, Serial No. 755,027

21 Claims. (Cl. 260—23.7)

This invention relates to the production of vulcanized polymers of drying and semi-drying oils, which are readily compatible with natural, reclaimed, and synthetic rubbers and which are useful as rubber replacements, rubber extenders, and rubber substitutes.

It is an object of this invention to produce, from drying and semi-drying oils, high molecular weight vulcanized products having to varying degrees the physical characteristics of vulcanized products made from natural rubber.

A more specific object of the invention is to produce high molecular weight molded and extruded rubber-like products.

It is a further specific object of the invention to produce high molecular weight vulcanized rubber-like products containing high molecular weight polymers derived from drying oils and synthetic rubber type copolymers.

Other objects and advantages will appear from the following description of the invention and specific examples of the preferred use of the same.

In application Serial No. 460,668, filed October 3, 1942, now matured into U. S. Patent No. 2,395,925, in which I was joined with John W. Eysenbach as inventor, there is described and claimed a process for the production of oleoresinous varnishes which consists essentially of heating a reaction mixture of an acid resin containing a free carboxylic acid group, and having an acid value of at least 50, and a polymerized drying oil to a temperature at which monomeric free fatty acids formed by the reaction will volatilize, and maintaining the mixture at such temperature until a substantial proportion, preferably from 5 to 30% of the material by weight, has been distilled from the mixture. The product of this operation, after cooling, being reduced or thinned with mineral spirits, and when required, having siccatives added thereto, yields a varnish composition having the desired properties to a far greater degree than varnishes which could have been produced from the same grade of materials by conventional varnish making procedures known prior to my invention.

In accordance with the present invention, it has been found that the foregoing reaction, when carried to the point of incipient gelation, produces more highly polymerized products which are suitable for vulcanization to form rubber-like products. These rubber-like vulcanized polymers have many properties resembling natural rubber and certain characteristics, e. g., in precision molding, superior to natural rubber. It may be pointed out further that the products described in the aforesaid U. S. Patent 2,395,925, do not make satisfactory rubber-like products when vulcanized. Furthermore, the aforesaid products are much more soluble in organic solvents than those of the present invention. Thus, the products of U. S. Patent 2,395,925 are completely soluble in solvents having a kauri butanol value of 35, and hence are eminently suitable for use as varnish bases, whereas unvulcanized products of the present invention are inherently incompletely soluble in solvents having a kauri butanol value of 35. These products of the present invention, on the other hand, can be dissolved in solvents having a kauri butanol value around 75, and can be used in coating compositions for concrete, which, however, are not classed as varnishes. The importance of the invention resides principally in the provision of a very simple process for producing new rubber-like materials from readily available raw materials, with no more equipment than a varnish kettle and a blowing coil.

The nature of my invention may best be understood by first referring to several specific examples of practical embodiments thereof, it being understood that the examples are given merely for purposes of illustration, and that my invention is not to be considered as limited to the particular ingredients, proportions, and procedures recited therein.

*Example I*

| | Pounds |
|---|---|
| WW rosin | 150 |
| Heat bodied linseed oil, (Z-6 viscosity, Gardner-Holdt scale) | 798 |

The oil and resin are put into a varnish kettle equipped with a blowing coil which rests on the bottom of the kettle. The oil and resin are then heated to 585° F., and steam or inert gas, such as nitrogen, carbon dioxide, or the like, is blown from the blowing coil through the contents of the kettle while maintaining the contents at 585° F. Under these conditions, a portion of the contents of the kettle will volatilize and be carried off in the stream of steam or inert gas. These conditions are maintained until signs of incipient gelation are evident. When this point has been reached may be determined by dipping a spade into the kettle so that it becomes coated with the material therein. If, when the spade is removed, the material does not run freely therefrom, but forms about a 1 inch string from the lower edge of the spade, the cooking has proceeded to the desired point and the kettle is removed from the fire and the contents allowed to cool. The blowing is continued as the temperature falls until, when tested with a spade as described above, the material forms about a 4 inch string. The blowing is then stopped, and the contents of the kettle are allowed to finish cooling. At the time the blowing is stopped, about 20% of the original weight of the batch will have been volatilized from the kettle. The cooled residue in the kettle is a viscous gel-like mass which, when treated as described below, exhibits many rubber-like properties.

A polymer which, when pigmented and cured as is hereinafter described, yielded a tougher, but less elastic and more brittle product, is prepared as follows:

*Example II*

|  | Pounds |
|---|---|
| WW rosin | 300 |
| Vacuum bodied linseed oil (37 minute viscosity) | 900 |

The above materials are charged into a varnish kettle equipped with a blowing coil and processed as described under Example I.

The resulting polymer, although of poorer quality when pigmented, cured and molded than that described under Example I, has, nevertheless, the desirable properties of strength and toughness which make it of value, when dissolved in aromatic or aliphatic solvents or prepared in a water emulsion, as a replacement for natural and synthetic rubber in cements, factices, etc.

The following example demonstrates the effect of low resin-oil ratio:

*Example III*

|  | Pounds |
|---|---|
| WW rosin | 100 |
| Heat bodied linseed oil, (Z-6 viscosity, Gardner-Holdt Scale) | 1,000 |

The above materials are put into a varnish kettle and processed as described under Example I. The product is a viscous, gel-like mass which, when pigmented and treated with sulfur and an accelerator as is hereinafter described, show some rubber-like properties but is low in strength, crumbles easily, and is difficult to mold.

For the resinous portion of the reaction mixture employed in carrying out my invention, I may use any acidic resin, as for example, rosin, polymerized rosin, hydrogenated rosin, run Congo, and others. I have found particularly advantageous certain dark grades of rosin and resinous fractions obtained in the manufacture of wood rosin. Of these, the resin separated by solvent fractionation in the manufacture of wood rosin, which is preponderantly insoluble in gasoline, and not completely soluble in aromatic hydrocarbons, but soluble in alcohol, is particularly desirable.

The physical constants of a satisfactory resin produced in the above described manner are as follows:

| | |
|---|---|
| Melting point (drop method) °C | 115 |
| Acid number | 93 |
| Gasoline-soluble matter per cent | 12 |
| Toluene-insoluble matter do | 20 |

Such a resin may be obtained on the market under the trade name of "Vinsol."

The acidity of the resin used in the reaction mixture may be partially neutralized by esterification with a polyhydric alcohol, such as glycerin, erythritol, pentaerythritol or the like. If this is done, the final product, after vulcanization, will have greater resistance to alkali and alkaline solutions. The following example illustrates such a procedure.

*Example IV*

| | |
|---|---|
| Vinsol pounds | 100 |
| Heat bodied linseed oil (Z-6 viscosity, Gardner-Holdt scale) gallons | 58 |
| Pentaerythritol pounds | 17 |
| Litharge do | ¼ |
| Raw linseed oil do | ¼ |

The Vinsol resin and heat bodied linseed oil are put in a varnish kettle equipped with a blowing coil as in Example I, and the mixture is heated to 400° F. The litharge, mixed as a slurry in the raw linseed oil to prevent settling of the litharge in the kettle, is then added with stirring; the temperature is raised to 500° F.; and the pentaerythritol is added with vigorous stirring. The batch is blown gently with a suitable inert gas while the temperature is raised to 525° F. and held for ½ hour. The temperature is then raised to 585° F., at which point dry steam is employed for blowing the batch instead of the inert gas. Steam blowing at this temperature is continued until the material, when tested with a spade as described in Example I, forms a web from the hot spade. At this point, approximately 10% of the starting material will have been volatilized from the kettle. The kettle is then removed from the fire, the blowing is stopped, and the batch is left to cool. When cool, the residue is a highly viscous, tacky, gel-like mass suitable for further treatment as described below to obtain the desired rubber-like properties.

The following example illustrates the complete preparation and compounding of a polymer and the results obtained therefrom on vulcanization. Polymers as described in Examples I to IV may be similarly compounded. The properties of the resulting product will vary with its composition as has been mentioned above.

*Example V*

| | Pounds |
|---|---|
| Vinsol | 100 |
| Heat bodied linseed oil (Z-6 viscosity, Gardner-Holdt scale) | 532 |

The above materials are charged into a varnish kettle and processed as described in Example I. The polymer is a viscous, tacky, gel-like mass which may be compounded and handled as described below in order to produce rubber-like articles therefrom.

| | Pounds |
|---|---|
| Polymer | 100 |
| Soft furnace carbon black | 80 |
| Zinc oxide | 5 |
| Sulfur | 5 |
| Mercaptobenzothiazole | 1 |

The above materials are thoroughly mixed in a heavy duty mixer and then run into a pan and baked in an oven or subjected to open steam for about 2 hours at 300° F. to effect a "bake-out" or "pre-cure." The resultant product is a cake of rubber-like material which will mill on an ordinary rubber mill without sticking to the rolls. When milled on a two roll mill and sheeted, it corresponds to the usual mill stock familiar to the rubber industry. This mill stock may be molded and cured according to conventional processes used in handling natural rubber. If cured in test molds for 20 minutes at 40 lbs. steam pressure, the molded slabs will have approximately the following properties:

Tensile strength _____ lbs./sq. in__ 300
Elongation at break _____ per cent__ 150
Hardness (Shore) _____ degrees__ 50-60

The product is generally comparable to natural rubber in its chemical and solvent resistance and in the degree to which it retains its original properties with age.

Any of the pigments, fillers and extenders used with natural rubber may be used with my new polymer, and any of the usual accelerators may replace the mercaptobenzothiazole. Antioxidants may be used if desired.

These polymers are valuable as extenders for natural and synthetic rubbers. In the case of the butadiene synthetic rubbers, these polymers, when introduced into the batch, give the product certain desirable properties not obtained without the polymer. For example, with GRS, Buna S, or synthetic rubbers composed of the copolymer of butadiene and styrene, the polymer prepared as described under Example V is easily incorporated with the synthetic rubber. It causes the batch to be much smoother, and it does not bloom to the surface of either the uncured or cured stock. Furthermore, it definitely imparts tackiness to this type of synthetic rubber. The higher the percent of polymer, the greater the tackiness becomes. Furthermore, stocks containing the polymer show good cohesiveness and are far superior to identical stocks prepared from the butadiene-styrene copolymer, but which do not contain my polymer. It will be found, in curing the stock, that the introduction of the polymer has decreased the rate of cure and, on examination of the cured stock, that the modulus and tensile strength have been somewhat decreased, but that elongation has been increased, while hardness of the stock remains practically unchanged.

The above statements are demonstrated by comparing the following compositions prepared with and without the use of my polymer as an extender.

| Compound | Composition No. 1 | Composition No. 2 |
|---|---|---|
| Synthetic Rubber GRS | 100 | 100 |
| Soft Channel Black | 50 | 50 |
| Zinc oxide | 5 | 5 |
| Sulfur | 2 | 2 |
| Mercaptobenzothiazole | 1.5 | 1.5 |
| Diphenylguanidine | 0.15 | 0.15 |
| Polymer from Example V | 20 | 0 |

When cured as indicated in the following table, the two compositions displayed the tabulated physical properties:

| Cure @ 298° F | 10 Min. | | 20 Min. | | 30 Min. | | 40 Min. | | 50 Min. | | 60 Min. | |
|---|---|---|---|---|---|---|---|---|---|---|---|---|
| Composition No. | 1 | 2 | 1 | 2 | 1 | 2 | 1 | 2 | 1 | 2 | 1 | 2 |
| Modulus 300% | 189 | 507 | 475 | 1,100 | 585 | 1,405 | 600 | 1,560 | 765 | 1,685 | 725 | 1,795 |
| Tensile Strength | 425 | 1,630 | 1,270 | 2,225 | 1,740 | 2,635 | 1,830 | 2,075 | 1,765 | 1,915 | 1,535 | 1,885 |
| Elongation | 615 | 595 | 640 | 465 | 685 | 455 | 600 | 340 | 585 | 345 | 540 | 325 |
| Hardness | 52 | 56 | 60 | 62 | 62 | 65 | 65 | 65 | 65 | 67 | 65 | 67 |

Using a Firestone Extrusion Plastometer, temperature of the upper and lower plate 180° F. pressure 7½ lbs. the plasticity of composition No. 1 was 23 and composition No. 2 was 40.

The hardness of the finished stock at low temperature is not increased by the introduction of my polymer. For example, grommets were molded from compositions No. 1 and No. 2, as shown above, and cured 30 minutes at 316° F. Hardness was determined before and after 4 hours exposure at −65° F. Hardness was then measured at this temperature, and both compositions showed a hardness of 95.

The introduction of my polymer into butadiene-styrene copolymer synthetic rubbers further improves the product in that tear resistance is increased thereby. Composition No. 1 and composition No. 2, when cured on the schedule shown below, exhibit tear resistance as follows:

| | Tear Resistance (Lbs./in. thickness) | |
|---|---|---|
| | Composition No. 1 | Composition No. 2 |
| 30 min. cure @ 298° F | 301 | 227 |
| 40 min. cure @ 298° F | 340 | 222 |
| 50 min. cure @ 298° F | 348 | 222 |

My polymer is equally valuable as an extender in other types of synthetic rubber, for example, in the type composed of the copolymer of butadiene and acrylonitrile. When introduced as an extender in batches based on this type of synthetic rubber, it greatly facilitates handling on the mill, adds tack to the stock, and induces much better flow and knitting in the molding operation.

The polymerized oil used in the foregoing examples is obtained by heating a varnish linseed oil, preferably a "break free" or alkali refined oil, with or without polymerizing catalysts, at a temperature of about 560 to 600° F. until the desired viscosity has been obtained. However, in preparing a vulcanizable polymer according to this invention, I may use any polymerized drying or semi-drying oil the fatty acids of which are of the non-conjugated polyunsaturated class, or are predominantly of that class. A few typical examples of suitable oils of that type are linseed oil, soya bean oil, walnut oil, sardine oil, and dehydrated castor oil.

While I have found operating at atmospheric pressure in preparing my polymer to be quite satisfactory, it is obvious that removal of the volatile materials could be accomplished more efficiently by cooking the batch under reduced pressure. Depending on the nature and proportions of the oil and resin used between about 5% and about 30% by weight of the original mixture should be removed by distillation.

In the above examples, the ratio by weight of resin to polymerized oil ranged from about 1 to 3 to about 1 to 10. If the ratio of resin to oil is greater than about 1 to 3 or less than about 1 to 10, there will be a noticeable loss in rubber-like properties of the final product after compounding and vulcanizing. The material having the higher resin content will be quite stiff and rather brittle, while that having the lower resin content will mold poorly, lack strength, and crumble easily.

From the foregoing description, it will be apparent to those skilled in the art that many resins and many oils may be used to advantage to produce rubber-like polymers in accordance with my invention, and that various combinations of oils, various combinations of resins, and various oil-resin combinations may likewise be employed. All such obvious variations are considered as falling within the scope of my invention, and it is not intended that the appended claims should be limited beyond their terms to the specific ingredients, proportions, and operating conditions illustrated.

In the foregoing specification, I have referred both to drying and semi-drying oils for the purpose of specifically including both in the class of oils disclosed as being useful in my invention. However, in the claims I have used the words "drying oil" in its broad sense to include both drying and semi-drying oils.

This application is a continuation as to common subject matter of my copending application, Serial No. 495,797, filed July 21, 1943, now abandoned.

Having thus described my invention, what I claim as new and desire to secure by Letters Patent is:

1. A process for producing rubber-like materials which comprises reacting a partially polymerized drying oil with an acidic natural resin having an acid value of at least 50, and containing a free carboxylic acid group, the proportion of acidic resin and partially polymerized drying oil being within the range of 1 part by weight of the acidic resin to from 3 to 10 parts by weight of the partially polymerized drying oil, said reaction being effected at temperatures effective to cause resin acid to displace from unpolymerized glyceride molecule present in said partially polymerized oil, volatile materials comprising principally free fatty acids, removing said volatile materials, including said free fatty acids while heating at temperatures within the range of 500–600° F. until incipient gelation of the residue is detectable and 5% to 30% of the volatiles are distilled off, and sulfur vulcanizing the resultant product.

2. A process as claimed in claim 1 in which the acidic resin is a rosin.

3. A process as claimed in claim 1, in which the acidic resin is rosin.

4. A process as claimed in claim 1, in which the acidic resin is the resin separated by solvent fractionation in the manufacture of wood rosin which is preponderantly insoluble in gasoline and not completely soluble in aromatic hydrocarbons but soluble in alcohol.

5. A vulcanized composition comprising a vulcanized residue resulting from the reaction of a partially polymerized drying oil with an oil-soluble acidic natural resin, containing a free carboxylic acid group and having an acid value of at least 50, the weight ratio of said resin to said oil being from 1:3 to 1:10, thereby to form a mixed glyceride of an oil and a resin acid while liberating volatile constituents including free fatty acids, heating at a temperature within the range from 500° F. to 600° F. the resultant mixture under conditions effective to remove the liberated volatile constituents therefrom until incipient gelation is detectable and 5% to 30% of the volatiles are distilled off and sulfur vulcanizing the resultant material.

6. A composition as claimed in claim 10, in which the rubber is a synthetic rubbery polymer comprising a butadiene-styrene polymer.

7. A composition as claimed in claim 5, in which said acidic resin is a rosin.

8. A composition as claimed in claim 5, in which said acidic resin is the resin separated by solvent fractionation in the manufacture of wood rosin, which is preponderantly insoluble in gasoline and not completely soluble in aromatic hydrocarbons but soluble in alcohol.

9. A vulcanized rubber-like composition comprising a vulcanized residue resulting from the reaction of a partially polymerized drying oil with an oil soluble acidic resin from the group consisting of rosin, polymerized rosin, hydrogenated rosin, run Congo and the resin separated by solvent fractionation in the manufacture of wood rosin which is preponderantly insoluble in gasoline and not completely soluble in aromatic hydrocarbons but soluble in alcohol, the weight ratio of said resin to said oil being from 1:3 to 1:10 and said reaction being effected by heating the reacting components at a temperature within the range of from 500 degrees F. to 600 degrees F. under conditions facilitating the distillation of liberated volatile constituents until incipient gelation is detectable and 5% to 30% of the volatile constituents have been distilled, and sulfur vulcanizing the resultant material.

10. A vulcanized rubber-like composition comprising a polymeric residue resulting from the reaction of a partially polymerized drying oil with an oil-soluble acidic natural resin containing a free carboxylic acid group and having an acid value of at least 50, to displace free fatty acids, the latter being removed from the residue, the proportions of acidic resin and partially polymerized drying oil being within the range from about 1 part by weight of resin to about 3 to 10 parts by weight of drying oil, and the resultant reaction mixture being heated within the range from 500 degrees to 600 degrees F. until incipient gelation occurs, sulfur vulcanized in intimate admixture with a sulfur vulcanizable rubbery polymer of a monomer containing a butadiene 1-3 nucleus.

11. A process for producing high molecular weight rubbery polymers of drying oils suitable for vulcanizing with rubber compounding ingredients, which comprises heating a mixture comprising 1 part by weight of an oil-soluble acidic natural resin containing a free carboxylic acid group and having an acid value of at least 50, and from 3 to 10 parts by weight of a partially polymerized drying oil to a temperature in the range of 500 degrees to 600 degrees F., maintaining the mixture at a temperature in said range under conditions facilitating removal of the more volatile products of reaction by distilling from 5 to 30 percent by weight of the mass, and continuing said heating until incipient gelation of the residue is detectable.

12. A process for producing high molecular weight rubbery polymers of drying oils suitable for vulcanizing with rubber compounding ingredients, which comprises heating a mixture comprising 1 part by weight of an oil-soluble acidic natural resin containing a free carboxylic acid group and having an acid value of at least 50, and from 3 to 10 parts by weight of a partially polymerized drying oil to a temperature in the range of 500 to 600 degrees F., maintaining the mixture at a temperature in said range, while blowing therethrough a gaseous fluid unreactive therewith to facilitate removal of the more volatile products of reaction by distilling from 5 to 30 percent by weight of the mass, and continuing said heating until incipient gelation of the residue is detectable.

13. A process for producing high molecular weight rubbery polymers of linseed oil suitable for vulcanizing with rubber compounding ingredients, which comprises heating a mixture comprising 1 part by weight of an oil-soluble acidic natural resin containing a free carboxylic acid group and having an acid value of at least 50, and from 3 to 10 parts by weight of a bodied linseed oil to a temperature in the range of 500 to 600 degrees F., maintaining the mixture at a temperature in said range, while blowing therethrough a gaseous fluid unreactive therewith to facilitate removal of the more volatile products of reaction by distilling from 5 to 30 percent by weight of the mass, and continuing said heating until incipient gelation of the residue is detectable.

14. A process for producing high molecular weight rubbery polymers of perilla oil suitable for vulcanizing with rubber compounding ingredients, which comprises heating a mixture comprising 1 part by weight of an oil-soluble acidic natural resin containing a free carboxylic acid group and having an acid value of at least 50, and from 3 to 10 parts by weight of a bodied perilla oil to a temperature in the range of 500 degrees to 600 degrees F., maintaining the mixture at a temperature in said range, while blowing therethrough a gaseous fluid unreactive therewith to facilitate removal of the more volatile products of reaction by distilling from 5 to 30 percent by weight of the mass, and continuing said heating until incipient gelation of the residue is detectable.

15. A process for producing high molecular weight rubbery polymers of soya bean oil suitable for vulcanizing with rubber compounding ingredients, which comprises heating a mixture comprising 1 part by weight of an oil-soluble acidic natural resin containing a free carboxylic acid group and having an acid value of at least 50, and from 3 to 10 parts by weight of a bodied soya bean oil to a temperature in the range of 500 to 600 degrees F., maintaining the mixture at a temperature in said range, while blowing therethrough a gaseous fluid unreactive therewith to facilitate removal of the more volatile products of reaction by distilling from 5 to 30 percent by weight of the mass, and continuing said heating until incipient gelation of the residue is detectable.

16. A process for producing high molecular weight rubbery polymers of linseed oil characterized by their insolubility in solvents having a low kauri-butanol value which comprises heating a mixture comprising 1 part by weight of rosin and from 3 to 10 parts by weight of a bodied linseed oil to a temperature in the range of 500 to 600 degrees F., maintaining the mixture at a temperature in said range, while blowing therethrough a gaseous fluid unreactive therewith to facilitate removal of the more volatile products of reaction by distilling from 5 to 30 percent by weight of the mass and continuing said heating until incipient gelation of the residue is detectable.

17. A process for producing high molecular weight rubbery polymers of perilla oil suitable for vulcanizing with rubber compounding ingredients, which comprises heating a mixture comprising 1 part by weight of rosin and from 3 to 10 parts by weight of a bodied perilla oil to a temperature in the range of 500 to 600 degrees F., maintaining the mixture at a temperature in said range, while blowing therethrough a gaseous fluid unreactive therewith to facilitate removal of the more volatile products of reaction by distillation, including free fatty acids until incipient gelation of the residue is detectable.

18. A process for producing high molecular weight rubbery polymers of soya bean oil suitable for vulcanizing with rubber compounding ingredients, which comprises heating a mixture comprising 1 part by weight of rosin and from 3 to 10 parts by weight of a bodied soya bean oil to a temperature in the range of 500 to 600 degrees F., maintaining the mixture at a temperature in said range, while blowing therethrough a gaseous fluid unreactive therewith to facilitate removal of the more volatile products of reaction by distillation, including free fatty acids until incipient gelation of the residue is detectable.

19. As a new composition of matter, the rubbery distillation residue resulting from heating a mixture comprising 1 part by weight of an oil-soluble acidic natural resin containing a free carboxylic acid group and having an acid value of at least 50, with from 3 to 10 parts by weight of a partially polymerized drying oil by the process of claim 11.

20. As a new composition of matter, the rubbery distillation residue resulting from heating a mixture comprising 1 part by weight of an oil-soluble acidic natural resin containing a free carboxylic acid group and having an acid value of at least 50, with from 3 to 10 parts by weight of a bodied linseed oil by the process of claim 11.

21. As a new compositon of matter, the rubbery distillation residue resuling from heating a mixture comprising 1 part by weight of rosin with from 3 to 10 parts by weight of a bodied linseed oil by the process of claim 11.

WILLIAM T. WALTON.

REFERENCES CITED

The following references are of record in the file of this patent:

UNITED STATES PATENTS

| Number | Name | Date |
|---|---|---|
| 2,234,545 | Auer | Mar. 11, 1941 |
| 2,322,106 | Auer | June 15, 1943 |
| 2,353,462 | Harkins | July 11, 1944 |
| 2,395,925 | Walton | Mar. 5, 1946 |
| 2,402,909 | Novak | June 25, 1946 |
| 2,407,038 | Stamberger | Sept. 3, 1946 |
| 2,428,299 | Spokes | Sept 30, 1947 |